United States Patent
Egorova (10) Patent No.: US 11,765,451 B2
(45) Date of Patent: Sep. 19, 2023

(54) IMAGE SENSOR SELECTION

(71) Applicant: Micron Technology, Inc., Boise, ID (US)

(72) Inventor: Marta Egorova, Harrington Park, NJ (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/466,000

(22) Filed: Sep. 3, 2021

(65) Prior Publication Data

US 2023/0072050 A1 Mar. 9, 2023

(51) Int. Cl.
*H04N 23/50* (2023.01)
*H04N 23/60* (2023.01)
*H04N 23/90* (2023.01)

(52) U.S. Cl.
CPC ............. *H04N 23/64* (2023.01); *H04N 23/50* (2023.01); *H04N 23/90* (2023.01)

(58) Field of Classification Search
CPC ... H04N 5/23222; H04N 5/2251; H04N 5/247
See application file for complete search history.

(56) References Cited

U.S. PATENT DOCUMENTS

| | | | |
|---|---|---|---|
| 8,022,977 B2 | 9/2011 | Kanade | |
| 2013/0016046 A1* | 1/2013 | Chou | G06F 1/3262 345/173 |
| 2014/0204035 A1* | 7/2014 | Chang | G06F 3/04166 345/173 |
| 2019/0369422 A1 | 12/2019 | Zeng | |
| 2020/0389575 A1* | 12/2020 | Gove | H04N 13/254 |
| 2022/0321755 A1* | 10/2022 | Nicholson | H04N 5/2352 |

OTHER PUBLICATIONS

Sam Byford, The World's First Under-Display Selfie Camera Isn't Very Good, Website: https://www.theverge.com/2020/12/21/22191459/zte-axon-20-5g-under-display-camera-hands-on, Dec. 21, 2020, The Verge, Vox Media, LLC, 10 Pages.

* cited by examiner

*Primary Examiner* — Mekonnen D Dagnew
(74) *Attorney, Agent, or Firm* — Brooks, Cameron & Huebsch (57) ABSTRACT

Methods and devices related to selecting image sensors are described. In an example, a method can include receiving, at a processing resource of a computing device, first signaling indicative of image data from a plurality of image sensors that are located under a surface of a display of the computing device; receiving, at the processing resource of the computing device, second signaling indicative of display data indicating a first portion of the display is active when the computing device is running an application, determining, at the processing resource, that a first image sensor of the plurality of sensors is closest to the first portion of the display, and selecting the first image sensor of the plurality of sensors closest to the first portion of the display for generating image data for the application.

20 Claims, 5 Drawing Sheets

IMAGE SENSOR SELECTION

TECHNICAL FIELD

The present disclosure relates generally to image sensor selection of under display image sensors.

BACKGROUND

A computing device can be a smartphone, a wearable device, a tablet, a laptop, a desktop computer, or a smart assistant device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

The present disclosure includes methods and apparatuses related to image sensor selection of under display image sensors. In some examples, a device can include a number of image sensors arranged in a number of patterns. The number of patterns of image sensors can correspond to portions of a display that can be configured to display different image data. For example, when using video conferencing applications, a display can include image data for a number of people and the pattern of image sensors in the display can correspond to the location of the image data of the number of people. It is natural for the user of the device to be looking at the portion of the display where the image of a person who is talking in the video conference application is located. In a number of embodiments, a sensor that is in located in and/or closest to the portion of the display where the image of a person who is talking in the video conference application is located can be selected to generate image data allowing the user to be looking at the sensor that is generating image data for use in the video conference application. In a number of embodiments, the image sensor can be selected based on an active portion of the display (e.g., the portion of the display that is displaying the image of a person talking) and/or based on a determination that the user is looking at a particular portion.

A number of embodiments of the present disclosure can include receiving, at a processing resource of a computing device, first signaling indicative of image data from a plurality of image sensors that are located under a surface of a display of the computing device; receiving, at the processing resource of the computing device, second signaling indicative of display data indicating a first portion of the display is active when the computing device is running an application; determining, at the processing resource, that a first image sensor of the plurality of sensors is closest to the first portion of the display; and selecting the first image sensor of the plurality of sensors closest to the first portion of the display for generating image data for the application.

As used herein, "a number of" something can refer to one or more of such things. A "plurality" of something intends two or more. The figures herein follow a numbering convention in which the first digit or digits correspond to the drawing figure number and the remaining digits identify an element or component in the drawing. Similar elements or components between different figures may be identified by the use of similar digits. For example, reference numeral 108 may reference element "08" in FIG. 1, and a similar element may be referenced as 308 in FIG. 3. In some instances, a plurality of similar, but functionally and/or structurally distinguishable, elements or components in the same figure or in different figures may be referenced sequentially with the same element number. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1:
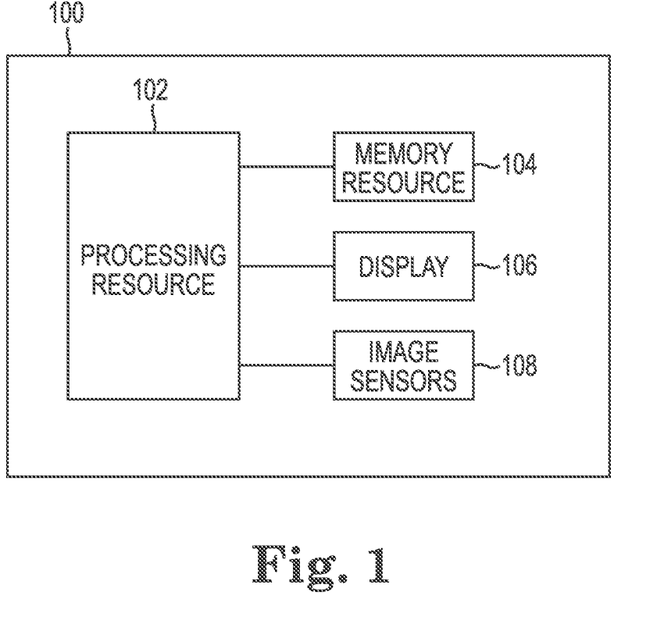
FIG. 1 is a functional block diagram in the form of a computing system including an apparatus having a display, an imaging device, a memory device, and a controller in accordance with a number of embodiments of the present disclosure.

FIG. 1 is a functional block diagram in the form of a computing system including an apparatus 100 having a processing resource 102, memory resource 104, a display 106, and image sensors 108. The apparatus 100 can be a computing device, such as a mobile device, tablet and/or computer, among other types of computing devices that include a display. The memory resource 104, display 106, and image sensors 108 can be coupled to the processing resource 102. The processing resource 102 can execute instructions to cause the memory resource 104 to store data, the image sensors 108 to capture image data, and the display 106 to display images.

The memory resource 104 can be any type of storage medium that can be accessed by the processing resource 102 to perform various examples of the present disclosure. For example, the memory resource 104 can be a non-transitory computer readable medium having computer readable instructions (e.g., computer program instructions) stored thereon that are executable by the processing resource 102 to select an image sensor to capture image data for use in an application in accordance with the present disclosure.

The memory resource 104 can be volatile or nonvolatile memory. The memory resource 104 can also be removable (e.g., portable) memory, or non-removable (e.g., internal) memory. For example, the memory resource 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory resource 104 is illustrated as being located within apparatus 100, embodiments of the present disclosure are not so limited. For example, memory resource 104 can be located on an external computing resource (e.g., enabling computer readable instructions to be downloaded over the Internet or another wired or wireless connection).

As illustrated in FIG. 1, apparatus 100 includes a display 106. A user (e.g., operator) of apparatus 100, can interact with apparatus 100 via a user interface shown on display 106. For example, the user interface via display 106 can provide (e.g., display and/or present) information to the user of apparatus 100, and/or receive information from (e.g., input by) the user of apparatus 100. For instance, in some embodiments, the user interface can be a graphical user interface (GUI) that can provide and/or receive information to and/or from the user of apparatus 100. The display 106 can be, for instance, a touch-screen (e.g., the GUI can include touch-screen capabilities).

The apparatus 100 can include one or more image sensors 108. The image sensors 108 can be used to capture videos or photographs. Image sensors 108 can be under display image sensors that are configured to capture image information when the portion of the display above the image sensors 108 can display images and allow light to pass through the display and reach the image sensors 108. For example, when one or more image sensors are activated, the portions of the display above the active image sensors can be active (e.g., displaying an image) and allow light to pass through the display and reach the image sensor, thus allowing the active image sensors to generate image data. When image sensor are not activated, the portion of the display above the image sensors that are not activated can be activated and displaying images, thus the image sensors that are not activated are not visible.

Figure 2A:
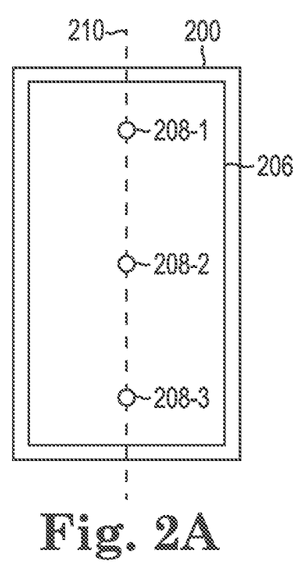
FIGS. 2A-2C illustrate an example of computing device having a number of image sensor patterns in accordance with a number of embodiments of the present disclosure.
Figure 2B:
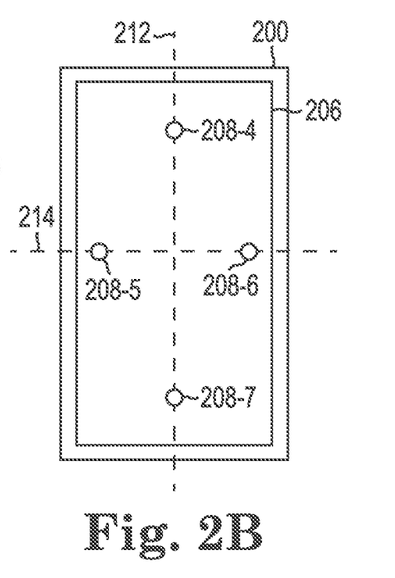
Figure 2C:
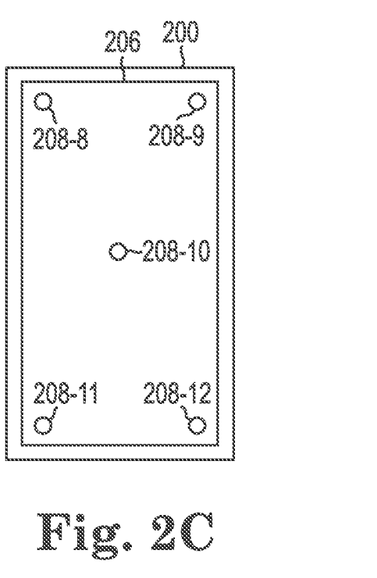

FIGS. 2A-2C illustrate an example of computing device having a number of image sensor patterns in accordance with a number of embodiments of the present disclosure. Embodiments of the present disclosure can include any number of image sensor located anywhere on the apparatus 200. FIGS. 2A-2C illustrate three examples of many patterns can be used according to embodiments of the present disclosure. In FIG. 2A, apparatus 200 includes a display 206 and image sensors 208-1, 208-2, and 208-3 in a pattern. The pattern includes image sensors 208-1, 208-2, and 208-3 spaced equidistant from each other along a longitudinal center line 210. In a number of embodiments, the apparatus can be configured to generate image data from image sensors 208-1, 208-2, and 208-3 and determine from the image data that a person in the image data is looking at image sensor 208-1. In response to determining that the person is looking at image sensor 208-1, the apparatus 200 can select image sensor 208-1 to be an active image sensor and use the image sensor 208-1 to generate image data for use by an application on the apparatus 200. In response to selecting image sensor 208-1, image sensors 208-2 and 208-3 can be inactivated and the portion of the display above image sensors 208-2 and 203-3 can be activated to display images.

In FIG. 2B, apparatus 200 includes a display 206 and image sensors 208-4, 208-5, 208-6 and 208-7 in a pattern. The pattern includes image sensors 208-4 and 208-7 spaced equidistant from respective edges of the display 206 and along a longitudinal center line 212; and image sensors 208-5 and 208-6 spaced equidistant from respective edges of the display 206 and along a latitudinal center line 214. In a number of embodiments, the apparatus can be configured to generate image data from image sensors 208-4, 208-5, 208-6 and 208-7 and determine from the image data that a person in the image data is looking at image sensor 208-5 and/or that a portion of the display including image sensor 208-5 is active (e.g., displaying image data of an active user of an application). In response to determining that the person is looking at image sensor 208-5 and/or that a portion of the display including image sensor 208-5 is active (e.g., displaying image data of an active user of an application), the apparatus 200 can select image sensor 208-5 to be an active image sensor and use the image sensor 208-5 to generate image data for use by an application on the apparatus 200. In response to selecting image sensor 208-5, image sensors 208-4, 208-6, and 208-7 can be inactivated and the portion of the display above image sensors 208-4, 208-5, 208-6, and 208-7 can be activated to display images.

In FIG. 2B, apparatus 200 includes a display 206 and image sensors 208-4, 208-5, 208-6 and 208-7 in a pattern. The pattern includes image sensors 208-4 and 208-7 spaced equidistant from respective edges of the display 206 and along a longitudinal center line 212; and image sensors 208-5 and 208-6 spaced equidistant from respective edges of the display 206 and along a latitudinal center line 214. In a number of embodiments, the apparatus can be configured to generate image data from image sensors 208-4, 208-5, 208-6 and 208-7 and determine from the image data that a person in the image data is closest to image sensor 208-5. In response to determining that the person shown on the display 206 is closest to image sensor 208-5, the apparatus 200 can select image sensor 208-5 to be an active image sensor and use the image sensor 208-5 to generate image data for use by an application on the apparatus 200 (e.g., generate image data, store the image data, and/or display the image data on apparatus 200). In response to selecting image sensor 208-5, image sensors 208-4, 208-6, and 208-7 can be inactivated and the portion of the display above image sensors 208-4, 208-5, 208-6, and 208-7 can be activated to display images.

In FIG. 2C, apparatus 200 includes a display 206 and image sensors 208-8, 208-9, 208-10, 208-11, and 208-12 in a pattern. The pattern includes image sensors 208-8, 208-9, 208-11, and 208-12 spaced equidistant from respective corners of the display 206; and image sensor 208-10 in the center of the display 206. In a number of embodiments, the apparatus can be configured to generate image data from image sensors 208-8, 208-9, 208-10, 208-11, and 208-12 and determine from the image data that a person in the image data is looking at image sensor 208-9 and/or that a portion of the display including image sensor 208-9 is active (e.g., displaying image data of an active user of an application). In response to determining that the person is looking at image sensor 208-9 and/or that a portion of the display including image sensor 208-9 is active (e.g., displaying image data of an active user of an application), the apparatus 200 can select image sensor 208-9 to be an active image sensor and use the image sensor 208-9 to generate image data for use by an application on the apparatus 200. In response to selecting image sensor 208-9, image sensors 208-8, 208-10, 208-11, and 208-12 can be inactivated and the portion of the display above image sensors 208-8, 208-10, 208-11, and 208-12 can be activated to display images.

Figure 3:
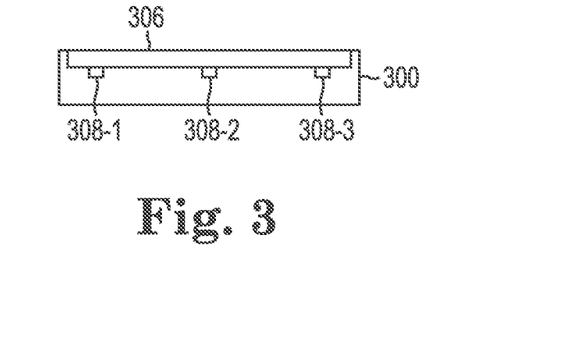
FIG. 3 illustrates a computing device having a number of under display image sensors in accordance with a number of embodiments of the present disclosure.

FIG. 3 illustrates a computing device having a number of under display image sensors in accordance with a number of embodiments of the present disclosure. In FIG. 3, a cross-sectional side view along a longitudinal centerline of apparatus 300 is show. Apparatus 300 can include a display 306 and image sensors 308-1, 308-2, and 308-3 in a pattern (e.g., the pattern illustrated in FIG. 2A). Image sensors 308-1, 308-2, and 308-3 are under display image sensors, such that image sensors 308-1, 308-2, and 308-3 are under display 306. Apparatus 300 can be configured such that when one more of image sensors 308-1, 308-2, and 308-3 are activated, the portion of the display 306 above the activated image sensors is transparent allowing light to pass through the portion of display 306 above the activated image sensors and reach the activated image sensors, so that the activated image sensors can generate image data.

Apparatus 300 can be configured such that when one more of image sensors 308-1, 308-2, and 308-3 are activated and/or deactivated, the portion of the display 306 above the activated and/or deactivated image sensors are activated and can display images on the display 306. When the portion of the display above image sensors 308-1, 308-2, and 308-3 are activated and displaying images, the image sensors 308-1, 308-2, and 308-3 are not visible to a viewer of the display 306 therefore the image sensors 308-1, 308-2, and 308-3 do not reduce the amount of viewable space on the display 306.

Figure 4A:
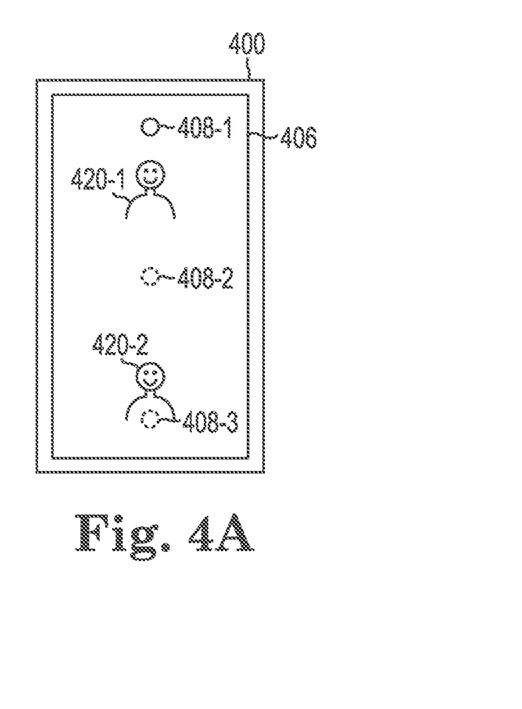
FIGS. 4A-4B illustrates a computing device with selected and unselected image sensors in accordance with a number of embodiments of the present disclosure.
Figure 4B:
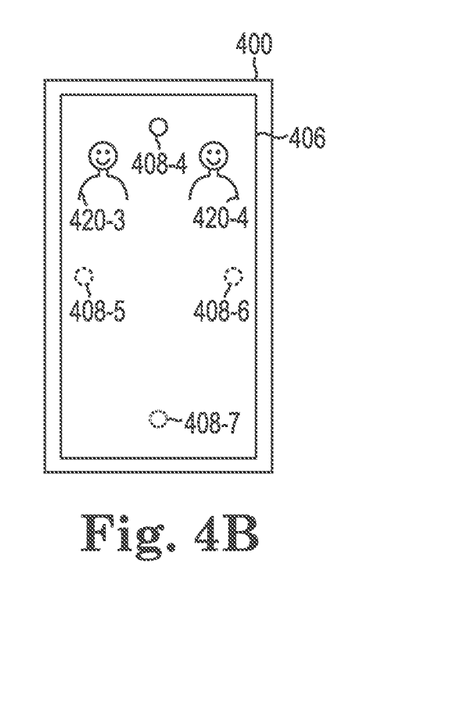

FIGS. 4A-4B illustrates a computing device with selected and unselected image sensors in accordance with a number of embodiments of the present disclosure. In FIG. 4A, apparatus 400 can be running a video conference application. The application can include two participant 420-1 and 420-1. The apparatus 400 can receive an input from the application indicating that participant 420-1 is active (e.g., talking or presenting, for example) in the application. For example, the application can receive an indication that participant 420-1 is talking and/or that sound from participant 420-1 is being emitted by speakers of the apparatus 400. Image sensors 408-1, 408-2, and 408-3 can generate image data and the application can receive the image data from image sensors 408-1, 408-2, and 408-3. The application can select 408-1 as the active image sensor for the application in response to input indication that participant 420-1 is active and that image sensor 408-1 is closest to the participant 420-1 on the display 406. Image sensor 408-1 can be activated and be used to generate image data of the user and that image data can be used by the application (e.g., sent for display on other devices using the application). Image sensors 408-2 and 408-3 can be deactivated, as indicated by the dotted lines in FIG. 4A. The portion of the display 406 above the image sensors 408-1, 408-2 and 408-3 can be activated and used to display images on the display 406, therefore making image sensors 408-1, 408-2 and 408-3, which are below display 406, not visible to a user.

In a number of embodiments, the application can analyze the image data from image sensors 408-1, 408-2, and 408-3 and determine that a user of the application is looking at image sensor 408-1. The application can select 408-1 as the active image sensor for the application in response to determining that the user is looking at image sensor 408-1. Image sensor 408-1 can be activated and be used to generate image data of the user and that image data can be used by the application (e.g., sent for display on other devices using the application). Image sensors 408-2 and 408-3 can be deactivated, as indicated by the dotted lines in FIG. 4A. The portion of the display 406 above the image sensors 408-1, 408-2 and 408-3 can be activated and used to display images on the display 406, therefore making image sensors 408-1, 408-2 and 408-3, which are below display 406, not visible to a user.

In FIG. 4B, apparatus 400 can be operating an application in a selfie camera mode. The application can be capturing a selfie image of two people 420-3 and 420-4. The application can analyze image data from image sensors 408-4, 408-5, 408-6, and 408-7 and determine that the people 420-3 and/or 420-4 are looking at image sensor 408-4. The application can select 408-4 as the active image sensor for the application in response to determining that people 420-3 and/or 420-4 are looking at image sensor 408-4. Image sensor 408-4 can be activated and be used to generate image data and that image data can be used by the application (e.g., stored as a photograph and/or video on apparatus 400). Image sensors 408-5, 408-6, and 408-7 can be deactivated as indicated by the dotted lines in FIG. 4B. The portion of the display 406 above the image sensors 408-4, 408-5, 408-6, and 408-7 can be activated and used to display images on the display 406, therefore making image sensors 408-4, 408-5, 408-6, and 408-7, which are below display 406, not visible to a user.

In a number of embodiments, the application can analyze image data from image sensors 408-4, 408-5, 408-6, and 408-7 and determine that the image of people 420-3 and/or 420-4 are located in a portion of the display 406 that is closest to image sensor 408-4. The application can select 408-4 as the active image sensor for the application in response to determining that the image of people 420-3 and/or 420-4 are located in a portion of the display 406 that is closest to image sensor 408-4 since people 420-3 and 420-4 are likely to be looking at image sensor 408-4. Image sensor 408-4 can be activated and be used to generate image data and that image data can be used by the application (e.g., stored as a photograph and/or video on apparatus 400). Image sensors 408-5, 408-6, and 408-7 can be deactivated, as indicated by the dotted lines in FIG. 4B, The portion of the display 406 above the image sensors 408-4, 408-5, 408-6, and 408-7 can be activated and used to display images on the display 406, therefore making image sensors 408-4, 408-5, 408-6, and 408-7, which are below display 406, not visible to a user.

Figure 5:
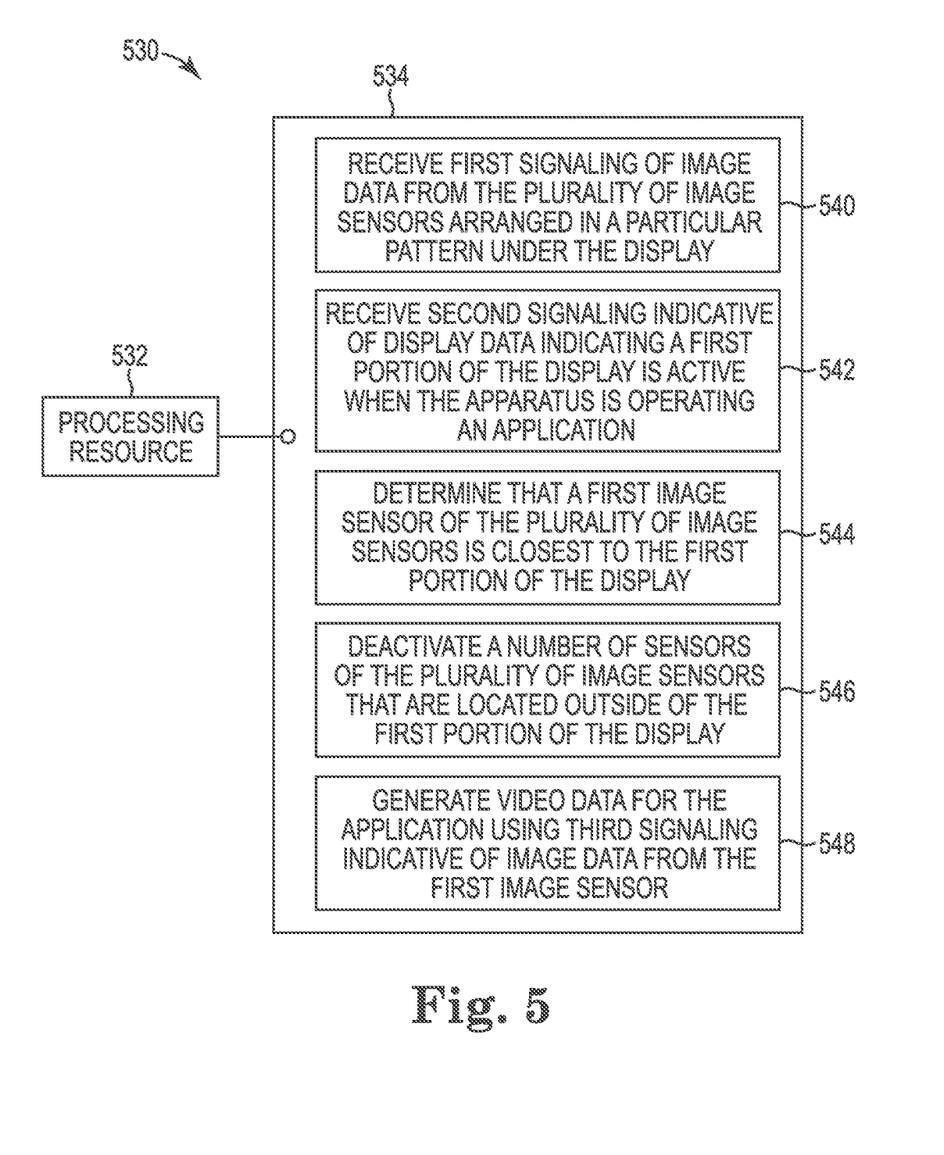
FIG. 5 is a functional diagram representing a processing resource in communication with a memory resource having instructions stored thereon for image sensor selection in accordance with a number of embodiments of the present disclosure.

FIG. 5 is a functional diagram representing a processing resource 532 in communication with a memory resource 534 having instructions 540, 542, 544, 546, and 548 stored thereon for image sensor selection in accordance with a number of embodiments of the present disclosure. In some examples, the processing resource 532 and memory resource 534 comprise a system 530 such as a computing device (e.g., mobile device and/or tablet, among other computing devices).

The system 530 can include a computing device with processing resource 532. The system 530 can be coupled (e.g., coupled via a wireless network) to other systems and/or computing devices. The system 530 can further include the memory resource 534 (e.g., a non-transitory MRM), on which may be stored instructions, such as instructions 540, 542, 544, 546, and 548. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 534 may be electronic, magnetic, optical, or other physical storage device that stores executable instructions. Thus, the memory resource 534 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 534 is a non-transitory MRM comprising Random Access Memory (RAM), an Electrically-Erasable Programmable ROM (EEPROM), a storage drive, an optical disc, and the like. The memory resource 534 may be disposed within a controller and/or computing device. In this example, the executable instructions 540, 542, 544, 546, and 548 can be "installed" on the device. Additionally, and/or alternatively, the memory resource 534 can be a portable, external or remote storage medium, for example, that allows the system to download the instructions 540, 542, 544, 546, and 548 from the portable/external/remote storage medium. In this situation, the executable instructions may be part of an "installation package". As described herein, the memory resource 534 can be encoded with executable instructions for image sensor selection.

The instructions 540, when executed by a processing resource such as the processing resource 532, can include instructions to receive, at the processing resource 532, the memory resource 534, or both, first signaling indicative of image data from the plurality of image sensors arranged in a particular pattern.

The instructions 542, when executed by a processing resource such as the processing resource 532, can include instructions to receive at the processing resource 532, the memory resource 534, or both, receive second signaling indicative of display data indicating a first portion of the display is active when the apparatus is operating an application.

The instructions 544, when executed by a processing resource such as the processing resource 532, can include instructions to determine that a first image sensor of the plurality of image sensors is closest to the first portion of the display.

The instructions 546, when executed by a processing resource such as the processing resource 532, can include instructions to deactivate a number of sensors of the plurality of sensors that are located outside of the first portion of the display.

The instructions 548, when executed by a processing resource such as the processing resource 532, can include instructions to generate video data for the application using third signaling indicative of image data form the first image sensor.

A number of embodiments of the present disclosure can include instructions that, when executed by a processing resource such as the processing resource 532, receive, at the processing resource 532, the memory resource 534, or both, first signaling indicative of image data from the plurality of image sensors arranged in a particular pattern under the display and receive second signaling indicative of display data indicating a first portion of the display is active when the apparatus is operating an application.

A number of embodiments of the present disclosure can include instructions that, when executed by a processing resource such as the processing resource 532, can determine that a first image sensor of the plurality of image sensors is closest to the first portion of the display, deactivate a number of sensors of the plurality of image sensors that are located outside of the first portion of the display, and generate video data for the application using third signaling indicative of image data from the first image sensor.

Figure 6:
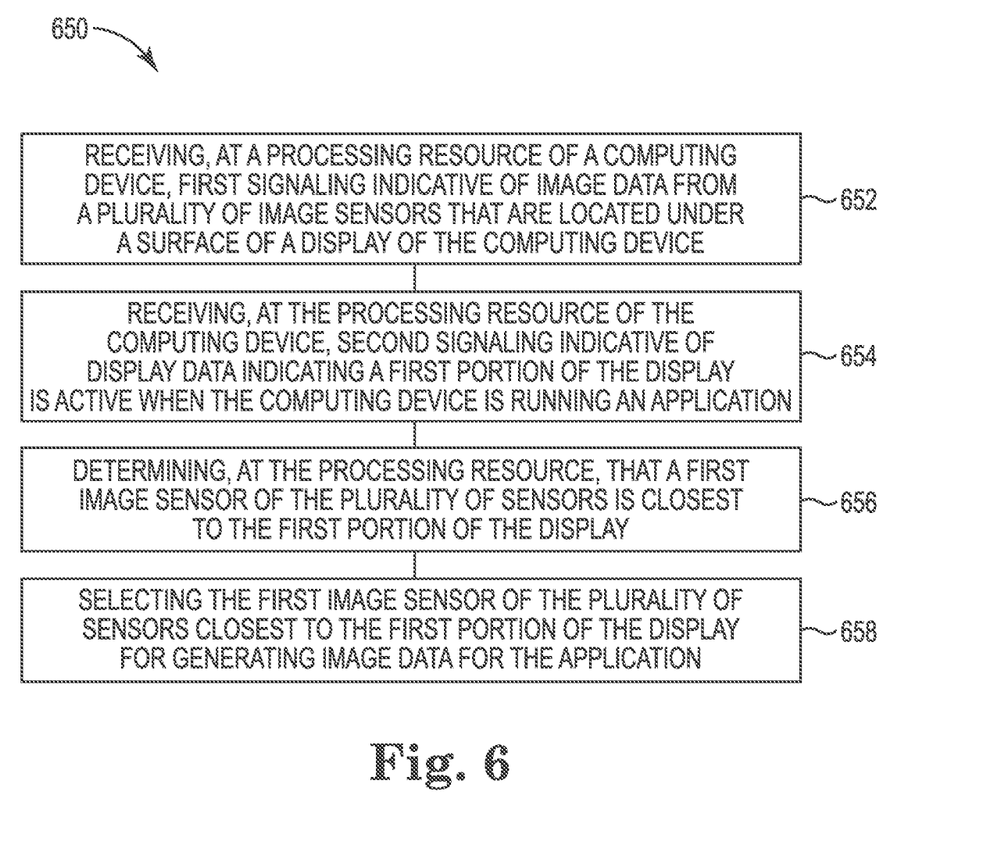
FIG. 6 is a flow diagram of a method for selecting image sensors in accordance with a number of embodiments of the present disclosure.

FIG. 6 is a flow diagram of a method 650 for selecting image sensors in accordance with a number of embodiments of the present disclosure. At 652, the method includes receiving, at a processing resource of a computing device, first signaling indicative of image data from a plurality of image sensors that are located under a surface of a display of the computing device.

At 654, the method includes receiving, at the processing resource of the computing device, second signaling indicative of display data indicating a first portion of the display is active when the computing device is running an application.

At 656, the method includes determining, at the processing resource, that a first image sensor of the plurality of sensors is closest to the first portion of the display.

At 658, the method includes selecting the first image sensor of the plurality of sensors closest to the first portion of the display for generating image data for the application. The method can include deactivating a number of image sensors of the plurality of image sensors that are located outside of the first portion of the display where the selected sensor is located.

The method can include receiving, at the processing resource of the computing device, third signaling indicative of display data indicating a second portion of the display is active when the computing device is running the application. The method can include determining, at the processing resource, that a second image sensor of the plurality of image sensors is closest to the second portion of the display, and selecting the second image sensor of the plurality of sensors closest to the second portion of the display for generating image data for the application.

The method can include receiving, at the processing resource of the computing device, fourth signaling indicative of display data indicating the first portion of the display is inactive when the computing device is operating the application and selecting, by the processing resource, the first image sensor of the plurality of image sensors for deactivation in response to receiving the fourth signaling.

The method can include receiving, at the processing resource, fifth signaling indicative of image data from the first sensor for use by the application in response to selecting the first sensor. The method can include generating, at the processing resource, video data for display by the application using the first signaling from the first image sensor, wherein the video data displays a user that is looking at another user of the application located in the first portion of the display.

The method can include activating, by the processing resource, portions of the display that are above sensors of the plurality of sensors that are selected and/or not selected for generating image data for the application and generating, by the processing resource, display data for the portions of display that cover the plurality of sensors of the plurality of sensors that are selected and/or not selected for generating image data for the application.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, at a processing resource of a computing device, first signaling indicative of image data from a plurality of image sensors that are located under a surface of a display of the computing device;
   receiving, at the processing resource of the computing device, second signaling indicative of display data indicating a first portion of the display is active when the computing device is running an application, wherein the first portion of the display is active in response to the display data in the first portion of the display being an image of a person talking;
   determining, at the processing resource, that a first image sensor of the plurality of sensors is within the first active portion of the display; and
   selecting the first image sensor of the plurality of sensors within the first active portion of the display for generating image data for the application.

2. The method of claim 1, further comprising deactivating a number of image sensors of the plurality of image sensors that are located outside of the first portion of the display.

3. The method of claim 1, further comprising receiving, at the processing resource of the computing device, third signaling indicative of display data indicating a second portion of the display is active when the computing device is running the application.

4. The method of claim 3, further comprising:
   determining, at the processing resource, that a second image sensor of the plurality of image sensors is closest to the second portion of the display, and
   selecting the second image sensor of the plurality of sensors closest to the second portion of the display for generating image data for the application.

5. The method of claim 1, further comprising receiving, at the processing resource of the computing device, fourth signaling indicative of display data indicating the first portion of the display is inactive when the computing device is operating the application.

6. The method of claim 5, further comprising further comprising selecting, by the processing resource, the first image sensor of the plurality of image sensors for deactivation in response to receiving the fourth signaling.

7. The method of claim 1, further comprising receiving, at the processing resource, fifth signaling indicative of image data from the first sensor for use by the application in response to selecting the first sensor.

8. The method of claim 1, further comprising generating, at the processing resource, video data for display by the application using the first signaling from the first image sensor, wherein the video data displays a user that is looking at another user of the application located in the first portion of the display.

9. The method of claim 1, further comprising activating, by the processing resource, portions of the display that cover sensors of the plurality of sensors that are not selected for generating image data for the application and the portion of the display that cover the sensor selected for generating image data.

10. The method of claim 1, further comprising generating, by the processing resource, display data for the portions of display that cover sensors of the plurality of sensors that are not selected for generating image data for the application and for portions of the display that cover sensors selected for generating image data.

11. An apparatus, comprising:
    a display;
    a plurality of image sensors located under a surface of the display;
    a memory resource; and
    a processing resource coupled to the display, the plurality of image sensors, and the memory resource, wherein the processing resource is configured to:
      receive first signaling indicative of image data from the plurality of image sensors arranged in a particular pattern;
      receive second signaling indicative of display data indicating a first portion of the display is active wherein the first portion of the display is active in response to the display data in the first portion of the display being an image of a person talking;
      when the apparatus is operating an application;
      determine that a first image sensor of the plurality of image sensors is within the first active portion of the display; and
      select the first image sensor of the plurality of image sensors within the first active portion of the display for generating image data for the application.

12. The apparatus of claim 11, wherein the processing resource is configured to deactivate portions of the display that cover the plurality of sensors when receiving the first signaling.

13. The apparatus of claim 11, wherein processing resource is configured to deactivate a portion of the display that covers the first sensor in response to selecting the first sensor for generating image data for the application.

14. The apparatus of claim 11, wherein processor is processing resource to activate portions of the display that cover image sensors that are not selected for generating image data for the application.

15. The apparatus of claim 11, wherein the processing resource is configured to select the first sensor for generating image data to allow a user to look at the active portion of the display when using the application to generate image data where the user is looking at another user of the application.

16. The apparatus of claim 11, wherein the particular pattern of the plurality of sensors are configured such that a number of active areas of the display include at least one sensor of the plurality of image sensors.

17. An apparatus, comprising:
a display;
a plurality of image sensors located under a surface of the display;
a memory resource; and
a processing resource coupled to the display, the plurality of image sensors, and the memory resource, wherein the processing resource is configured to:
    receive first signaling indicative of image data from the plurality of image sensors arranged in a particular pattern under the display;
    receive second signaling indicative of display data indicating a first portion of the display is active wherein the first portion of the display is active in response to the display data in the first portion of the display being an image of a person talking;
    when the apparatus is operating an application;
    determine that a first image sensor of the plurality of image sensors is within the first portion of the active display;
    deactivate a number of sensors of the plurality of image sensors that are located outside of the first portion of the display; and
    generate video data for the application using third signaling indicative of image data from the first image sensor.

18. The apparatus of claim 17, wherein the plurality of image sensors include image sensors spaced equidistant from each other along a longitudinal center line of the display.

19. The apparatus of claim 17, wherein the plurality of image sensors include image sensors located along a longitudinal center line of the display and image sensors located along a latitudinal center line of the display.

20. The apparatus of claim 17, wherein the plurality of image sensors include an image sensor located in each quadrant of the display and an image sensor in the center of display.

* * * * *